(12) United States Patent
Leber

(10) Patent No.: US 7,055,663 B2
(45) Date of Patent: Jun. 6, 2006

(54) HYDRODYNAMIC TORQUE CONVERTER

(75) Inventor: Fritz Leber, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 7 days.

(21) Appl. No.: 10/771,720

(22) Filed: Feb. 4, 2004

(65) Prior Publication Data

US 2004/0188206 A1 Sep. 30, 2004

(30) Foreign Application Priority Data

Mar. 28, 2003 (DE) .................... 103 14 333

(51) Int. Cl.
*F16H 61/48* (2006.01)
(52) U.S. Cl. .................. 192/3.25; 192/3.29; 192/30 W
(58) Field of Classification Search ............... 192/3.21, 192/3.25, 3.27, 3.28, 3.29; 324/207.22
See application file for complete search history.

(56) References Cited

U.S. PATENT DOCUMENTS

| | | | | |
|---|---|---|---|---|
| 2,258,684 A | * | 10/1941 | Lysholm et al. ........... 192/3.27 |
| 2,994,197 A | * | 8/1961 | Mamo .......................... 60/345 |
| 3,572,168 A | * | 3/1971 | Shirai et al. ................... 475/62 |
| 3,713,351 A | * | 1/1973 | Sakakibara et al. ........... 477/61 |
| 3,820,417 A | * | 6/1974 | Allen et al. ..................... 475/65 |
| 4,586,401 A | * | 5/1986 | Nogle .......................... 475/60 |
| 4,922,424 A | | 5/1990 | Hiramatsu ............... 364/424.1 |
| 4,954,775 A | * | 9/1990 | Richmond ................... 324/174 |
| H964 H | * | 9/1991 | Olson et al. ........... 324/207.22 |
| 5,509,520 A | | 4/1996 | Evans et al. ................ 192/3.23 |
| 5,772,550 A | * | 6/1998 | Kamada et al. ............. 475/120 |
| 6,347,269 B1 | * | 2/2002 | Hayakawa et al. ........... 701/51 |

FOREIGN PATENT DOCUMENTS

| | | |
|---|---|---|
| DE | 38 12 673 C2 | 8/1995 |
| DE | 195 21 458 A1 | 12/1995 |
| DE | 196 32 345 C2 | 1/2000 |

* cited by examiner

*Primary Examiner*—Rodney H. Bonck
(74) *Attorney, Agent, or Firm*—Davis & Bujold, P.L.L.C.

(57) ABSTRACT

To be able to determine the torque of a turbine rotor (7) with precision even when a clutch (3) is operated with slippage, a rotation speed sensor (13) determines the speed of a pump impeller wheel (2) and a rotation speed sensor determines the speed of the turbine rotor (7), and the speed signals are transmitted to an electronic control unit which, with reference to stored torque converter data, determines the torque of the turbine rotor.

1 Claim, 3 Drawing Sheets

US 7,055,663 B2

HYDRODYNAMIC TORQUE CONVERTER

This application claims priority from German Application Ser. No. 103 14 333.5 filed Mar. 28, 2003.

FIELD OF THE INVENTION

The invention concerns a hydrodynamic torque converter.

BACKGROUND OF THE INVENTION

Hydrodynamic torque converters are often inserted between a drive engine and a speed-shift transmission, particularly in the case of working machines such as wheel loaders, stackers or graders. In this, the momentary output torque delivered by the torque converter is very important for the control, preferably of the speed-change transmission.

DE 195 21 458 A1 discloses an electro-hydraulic control device for the drive of a machine with a torque converter, which comprises a clutch between the pump impeller wheel and the drive engine and in which the speed of the drive engine and the speed of the transmission are determined and passed on to an electronic control unit.

The purpose of the present invention is to determine the output torque of a hydrodynamic torque converter in which a clutch connects the pump impeller wheel of the torque converter to a drive engine, with precision at any operating point.

This objective is achieved with a hydrodynamic torque converter of the generic type described, which also comprises the characterizing features of the principal claim.

SUMMARY OF THE INVENTION

The hydrodynamic converter is driven by a drive engine via a clutch, according to the invention; this clutch is arranged ahead of the pump impeller wheel of the hydrodynamic torque converter. The clutch can be arranged inside the converter housing or outside it. Likewise, the clutch can be arranged inside the change-under-load transmission positioned on the output side. A rotation speed sensor detects the speed of the turbine rotor or that of a component in rotationally fixed connection with the turbine rotor, such as components in the drive train of the gearshift mechanism, and a rotation speed sensor detects the speed of the pump impeller wheel, and both these speed signals are transmitted to an electronic control unit. Since the speed of the pump impeller wheel is determined, the electronic control unit can determine the torque of the turbine rotor with reference to stored hydrodynamic torque converter values. Since the speed of the pump impeller wheel is determined directly, the torque of the turbine rotor can be determined by the electronic control unit even if there is clutch slip between the drive engine and the pump impeller wheel, which would not be possible if only the speed of the drive engine and that of the turbine rotor were being determined.

Preferably, radially on the inside the pump impeller wheel has a flange at the axial end of which are arranged means enabling the detection of the rotation speed. Preferably, these means are in the form of cams. Thus, a speed sensor or a Hall sensor can produce the speed signals when the pump impeller wheel is rotating.

In another embodiment the speed sensor is arranged axially or radially in a component held in rotationally fixed connection with the stator.

In a further embodiment the flange connected to the pump impeller wheel extends into a change-under-load transmission arranged on the output side, in which the clutch can also be located. In this embodiment the speed sensor is also arranged in the transmission housing in a component held in rotationally fixed connection.

BRIEF DESCRIPTION OF THE DRAWINGS

The invention will now be described, by way of example, with reference to the accompanying drawings in which.

DETAILED DESCRIPTION OF THE INVENTION

Figure 1:
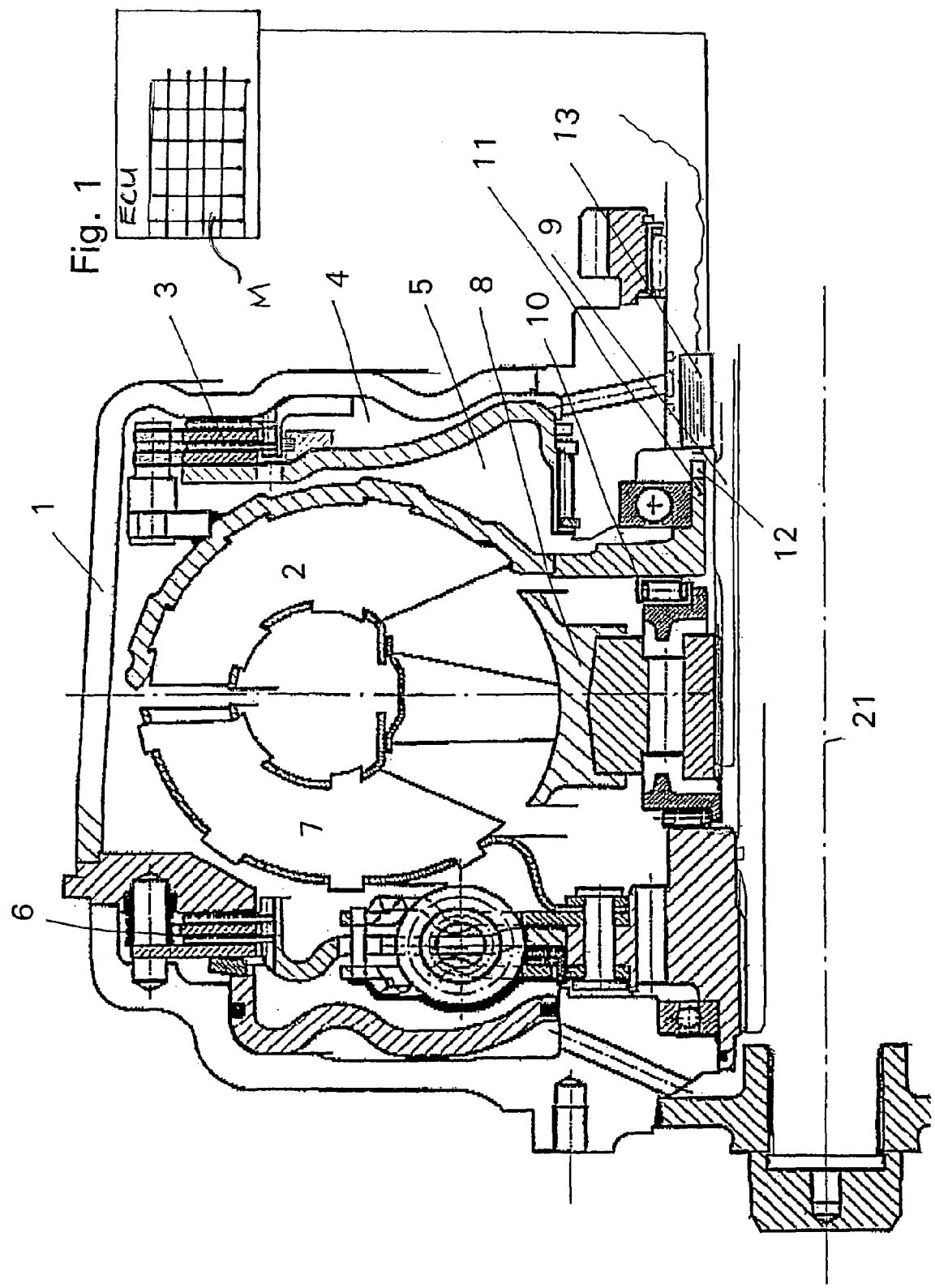
FIG. 1 is a hydrodynamic torque converter with a primary clutch and a converter bridging clutch.
Figure 2:
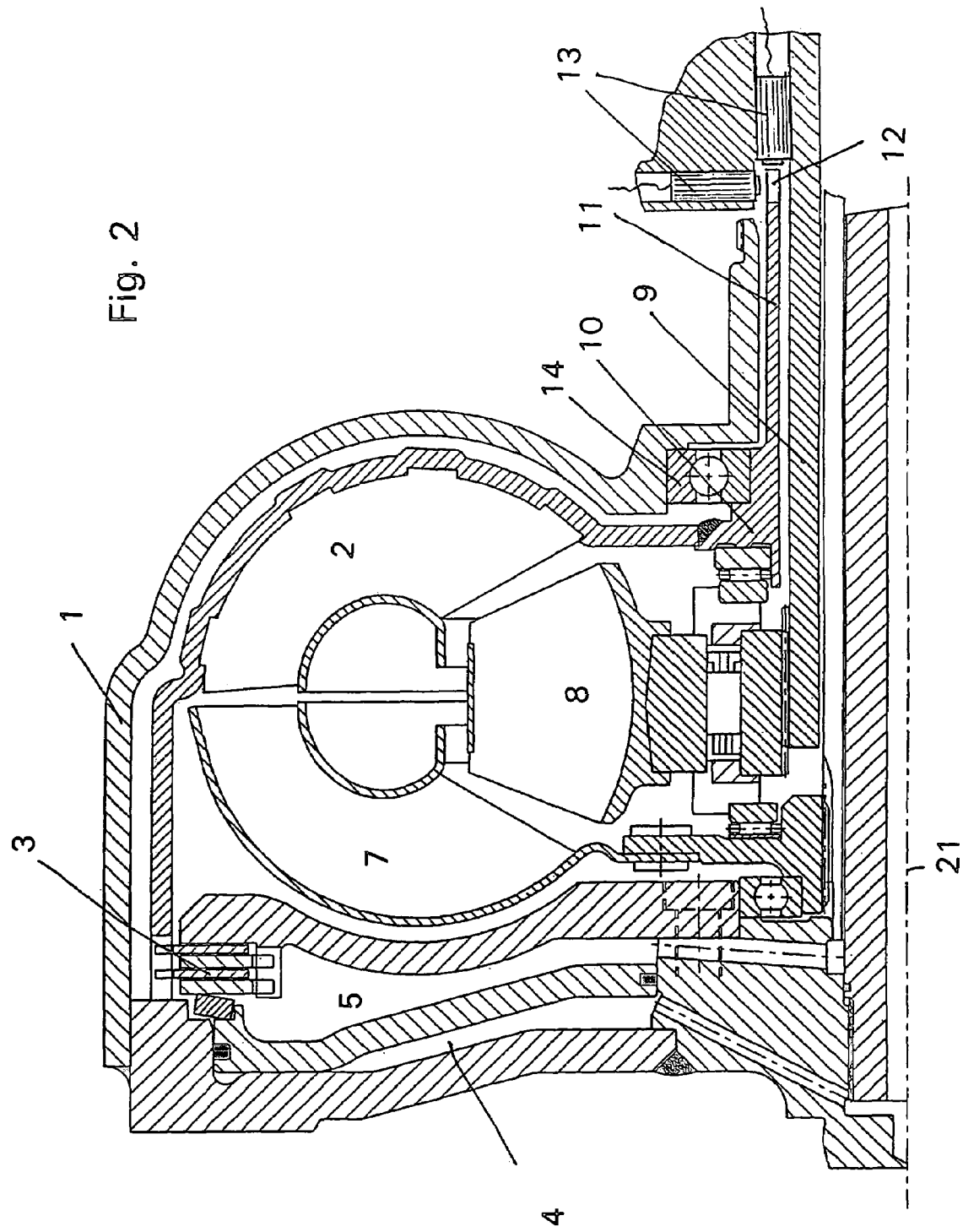
FIG. 2 is a hydrodynamic torque converter with a primary clutch arranged adjacent to the turbine rotor.
Figure 3:
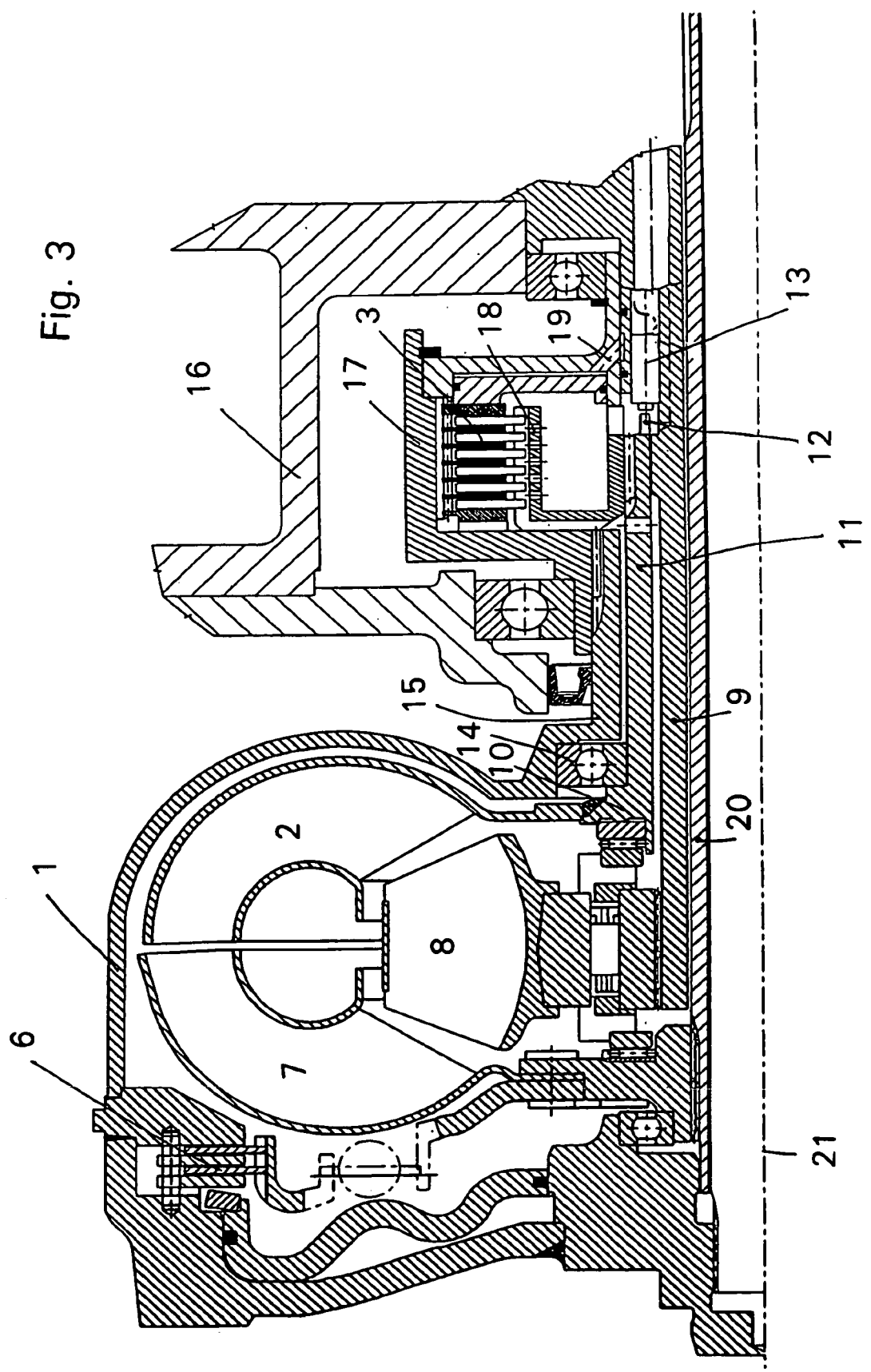
FIG. 3 is a hydrodynamic torque converter with a primary clutch arranged in a transmission housing.

FIG. 1:

A converter housing 1 is in rotationally fixed connection with a drive engine (not shown). A pump impeller wheel 2 can be connected to the converter housing by a clutch 3, which is the so-termed primary clutch. Depending on the actuation pressure in a space 4 and on the converter housing pressure in a space 5, the clutch produces a transmissible torque such that the hydrodynamic torque converter can even be operated when there is slippage of the clutch 3. The converter housing 1 can be connected directly to a turbine rotor 7 by means of a converter bridging clutch 6. A stator 8 is in rotationally fixed connection with a positionally fixed component 9. Radially on the inside, the impeller 2 has a flange 10 which, on the one hand, serves to support the impeller and, on the other hand, has on its inner axial extension 11 cams 12 that enable the speed to be detected by a speed sensor 13. The speed sensor 13 is arranged in the positionally fixed component 9, allowing the signal leads to be positioned statically. A further speed sensor (not shown) determines the rotation speed of the turbine rotor 7, and the signals giving the speed of the turbine rotor 7 and the speed of the pump impeller wheel 2 are passed on to an electronic control unit (ECU) in which characteristic hydrodynamic torque converter values are stored in a performance matrix M, and which can determine the torque of the turbine rotor with reference to those values. Likewise, it is possible to transmit to the electronic control unit further signals from temperature and pressure sensors, so as to render the calculation of the torque more precise.

FIG. 2:

The converter housing 1 is connected to a drive engine (not shown). The pump impeller wheel 2 can be connected to the converter housing 1 by the clutch 3, this clutch 3 being arranged adjacent to the turbine rotor 7. The clutch 3 is actuated as a function of the pressures in the spaces 4 and 5. Radially on the inside, the pump impeller wheel 2 has a flange 10 which, at the same time, supports the pump impeller wheel 2 via a bearing 14, and on its axial extension 11 the flange 10 has cams 12 which enable a rotation speed sensor, which can be arranged axially or radially in the positionally fixed component 9, to determine the speed of the pump impeller wheel 2.

FIG. 3:

A converter housing 1 is in rotationally fixed connection with a drive engine (not shown). A flange 15 of the converter housing 1 extends into a transmission housing 16 and is in rotationally fixed connection with a disk carrier 17 of the clutch 3. Radially on the inside, the pump impeller wheel 2 has a flange 10 which extends into the transmission housing 16 and which is in rotationally fixed connection with a disk carrier 18 of the clutch 3. By means of the clutch 3, the pump impeller wheel 2 can be connected to the converter housing 1 and so also to the drive engine. In a positionally fixed component of the transmission housing in which a pressure feed line 19 for the clutch 3 can also be arranged, there is a rotation speed sensor 13 which determines the speed of the pump impeller wheel 2 by virtue of cams 12. The cams 12 are at the axial end of the flange 10. The turbine rotor 7 is in rotationally fixed connection with a shaft 20 which constitutes the drive input of the change-under-load transmission connected after the converter. The speed of the turbine rotor 7 can be determined by a rotation speed sensor from the shaft 20. The cams 12 are arranged parallel to a rotation axis 21. The speed sensor can be arranged parallel or at right angles to the rotation axis 21.

REFERENCE NUMERALS

1 Converter housing
2 Pump impeller wheel
3 Clutch
4 Space
5 Space
6 Bridging clutch
7 Turbine rotor
8 Stator
9 Positionally fixed component
10 Flange
11 Axial extension
12 Cams
13 Rotation speed sensor
14 Bearing
15 Flange
16 Transmission housing
17 Disk carrier
18 Disk Carrier
19 Pressure feed line
20 Shaft
21 Rotation axis

The invention claimed is:

1. A hydrodynamic torque converter, comprising:
a clutch (3) arranged between a pump impeller wheel (2) and a drive mechanism;
a turbine rotor (7) forming a drive output,
a first speed sensor detecting the speed of the turbine rotor (7);
a second speedisensor detecting the speed of the pump impeller wheel;
an electronic control unit (2) communicating with the first and second speed sensors to receive the detected speeds of the pump impeller wheel and turbine rotor (7);
a performance matrix containing characteristic hydrodynamic torque converter values of the torque converter is stored in the electronic control unit, with reference to which, using the detected speed of the pump impeller wheel (2) and the detected speed of the turbine rotor (7), the electronic control unit determines the torque of the turbine rotor (7); and
wherein the purhp impeller wheel (2) has an inner axial extension (11) axially depending from the pump impeller wheel (2), the axial extension (11) having an axial end defining cams enabling the rotation speed of the pump impeller wheel (2) to be detected, and the cams are integrally formed on the axial end of the inner axial extension parallel to a rotation axis of the torque converter.

* * * * *